J. LIVESEY, J. & J. KIDD.
Apparatus for Enriching Gas.
No. 227,547.
Patented May 11, 1880.
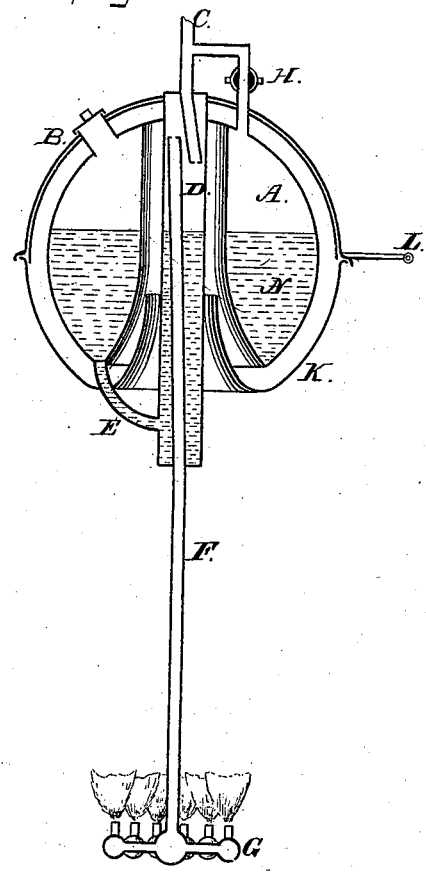
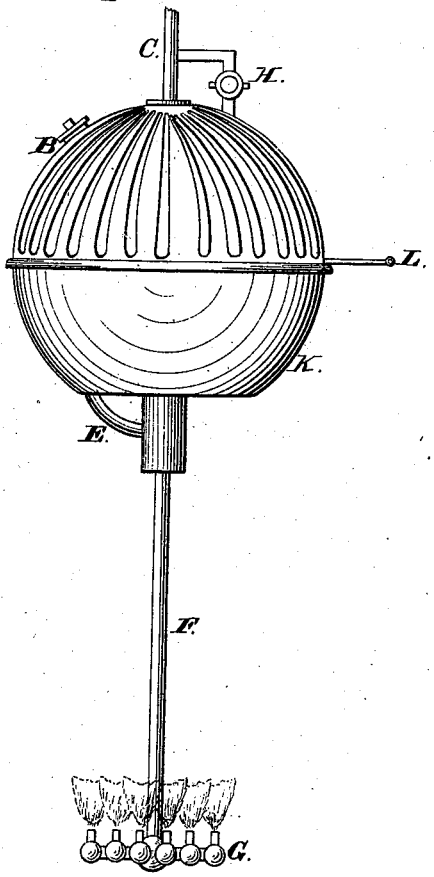

UNITED STATES PATENT OFFICE.

JAMES LIVESEY, JOSHUA KIDD, AND JAMES KIDD, OF LONDON, ENGLAND.

APPARATUS FOR ENRICHING GAS.

SPECIFICATION forming part of Letters Patent No. 227,547, dated May 11, 1880.

Application filed February 25, 1880.

*To all whom it may concern:*

Be it known that we, JAMES LIVESEY, JOSHUA KIDD, and JAMES KIDD, all of London, in the county of Middlesex, England, have invented a certain new and useful Improved Apparatus for Enriching Gas; and we do hereby declare that the following is a full, clear, and exact description of the invention, which will enable others skilled in the art to which it appertains to make and use the same.

Our invention relates to apparatus for enriching gas by mingling with it vapor of the hydrocarbon naphthaline, the said vapor being generated by the heat of the enriched gas-flames, as we will describe.

Referring to the accompanying drawings, Figure 1 is a vertical section, and Fig. 2 an elevation, of apparatus according to our invention.

A is a reservoir, of spherical or other convenient form, containing a store of naphthaline, which is introduced into it in the form of fragments or pellets by an opening at the upper part of the vessel, closed by a screw-cap, B.

Through the reservoir A is a vertical tubular passage, within which is a carbureting-tube, D, communicating with the reservoir A by a pipe, E, at the bottom.

Gas is supplied to the carbureting-tube D by a pipe, C, which has a branch, preferably provided with a stop-cock, H, leading into the reservior A.

From the upper part of the tube D a pipe, F, descends, to supply the gas-burners G. When these are lighted the hot products of their combustion ascend, heating the carbureting-tube D, melting the naphthaline therein, and generating vapor, which mingles with the gas supplied by the pipe C, enriching it, and the enriched gas descends by the pipe F to the burners G, where it produces a highly-luminous flame.

As the naphthaline wastes in the carbureting-tube D a fresh supply flows into it by the pipe E from the reservoir A, in which it is in a melted condition, the pressures in A and D being equalized by the communications at top and bottom.

When it is required to give a fresh supply to the reservoir A without extinguishing the lights the stop-cock H can be closed, and then the cover B can be removed for introducing the material.

The reservoir A is shielded from the direct heat of the products of combustion by a casing, K, which wholly incloses and covers the reservoir, and is provided in its bottom portion with an opening communicating with the tubular passage through said reservoir. The upper part of this casing may be made as a ventilator-valve, as shown, so that this valve being moved partly round by a handle, L, more or less circulation of air may be permitted through the casing, the reservoir A being thus maintained at heat sufficient to keep its contents melted, but not to vaporize them.

The reservoir A may be made of considerable capacity, so as to contain a store of naphthaline sufficient for consumption during a considerable time.

The carbureting-tube D is made of relatively small dimension, so that the comparatively small quantity of naphthaline which it contains is rapidly heated, and evolves vapor very soon after lighting the gas.

Moreover, by making this tube of small section the surface from which the vapor is evolved is limited in area, thus governing the amount of vapor generated to suit the number of burners supplied.

Having thus described the nature of our invention, and the best means we know of putting it in practice, we claim—

1. In an apparatus for enriching illuminating-gas, the combination of a reservoir for containing hydrocarbon naphthaline having a vertical tubular passage through it, a carbureting-chamber within said tubular passage, suitable pipes or passages respectively connecting the upper and lower ends of the carbureting-chamber with the upper and lower portions of the reservoir and with a gas-supply pipe, and a pipe or passage leading from the carbureting-chamber to the gas-burner, all substantially as described.

2. The combination, with the reservoir for containing hydrocarbon naphthaline having the tubular passage extending through it, of the casing K, wholly inclosing the reservoir, and having an opening in its lower portion communicating with the tubular passage through the reservoir, substantially as described.

In testimony whereof we have signed our names to this specification, in the presence of two subscribing witnesses, this 19th day of January, 1880.

JAMES LIVESEY.
JOSHUA KIDD.
JAMES KIDD.

Witnesses:
JNO. P. M. MILLARD,
CHAS. BERKLEY HARRIS.